(12) United States Patent
Morariu et al.

(10) Patent No.: US 9,472,114 B2
(45) Date of Patent: Oct. 18, 2016

(54) COMPUTER-IMPLEMENTED METHOD, SYSTEM AND PROGRAM PRODUCT FOR PROVIDING AN EDUCATIONAL PROGRAM

(75) Inventors: Janis A. Morariu, Hardy, VA (US); Steven W. Stapel, Eden Prairie, MN (US); Janell Straach, Coppell, TX (US); Elizabeth E. Wright, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 2905 days.

(21) Appl. No.: 10/873,346

(22) Filed: Jun. 22, 2004

(65) Prior Publication Data

US 2005/0282136 A1    Dec. 22, 2005

(51) Int. Cl.
*G09B 5/00*    (2006.01)
*G09B 7/00*    (2006.01)

(52) U.S. Cl.
CPC .. *G09B 7/00* (2013.01); *G09B 5/00* (2013.01)

(58) Field of Classification Search
USPC .......................................... 434/350, 322, 118
See application file for complete search history.

(56) References Cited

U.S. PATENT DOCUMENTS

| | | | |
|---|---|---|---|
| 5,394,553 A | 2/1995 | Lee | |
| 5,644,686 A * | 7/1997 | Hekmatpour | 706/45 |
| 5,823,781 A | 10/1998 | Hitchcock et al. | |
| 5,823,789 A * | 10/1998 | Jay et al. | 434/365 |
| 5,833,468 A | 11/1998 | Guy et al. | |
| 5,904,485 A | 5/1999 | Siefert | |
| 6,149,438 A | 11/2000 | Richard et al. | |
| 6,162,060 A | 12/2000 | Richard et al. | |
| 6,315,572 B1 | 11/2001 | Owens et al. | |
| 6,431,875 B1 | 8/2002 | Elliott et al. | |
| 6,438,353 B1 | 8/2002 | Casey-Cholakis et al. | |
| 6,498,920 B1 | 12/2002 | Simon | |
| 6,507,726 B1 | 1/2003 | Atkinson et al. | |
| 6,519,445 B2 | 2/2003 | Casey-Cholakis et al. | |
| 6,561,812 B1 | 5/2003 | Burmester et al. | |
| 6,615,220 B1 * | 9/2003 | Austin et al. | |
| 6,640,249 B1 | 10/2003 | Bowman-Amuah | |
| 6,937,841 B1 | 8/2005 | Guy et al. | |
| 7,153,137 B2 | 12/2006 | Altenhofen et al. | |
| 2001/0023059 A1 | 9/2001 | Toki | |

(Continued)

FOREIGN PATENT DOCUMENTS

| | | |
|---|---|---|
| FR | 2803928 | 7/2001 |
| JP | 2000066572 | 3/2000 |

(Continued)

OTHER PUBLICATIONS

Matsumoto et al., INSPEC, "An Evaluation System of Historical Data Based on Learning Environment Supported by Educational Software", Sep. 1999.

(Continued)

*Primary Examiner* — Robert J Utama
(74) *Attorney, Agent, or Firm* — Lisa Ulrich; Hoffman Warnick LLC (57) ABSTRACT

Under the present invention a plurality of learning objects for an educational program are provided. Based on the selections, a solution scenario having contextual data for interrelating the plurality of learning objects is developed, and is maintained separately from each of the plurality of learning objects. Using the solution scenario, the plurality of learning objects are aggregated to form the educational program.

30 Claims, 5 Drawing Sheets

(56) References Cited

U.S. PATENT DOCUMENTS

| | | | |
|---|---|---|---|
| 2001/0027404 A1 | 10/2001 | Loveland | |
| 2002/0072049 A1 | 6/2002 | Prahalad | |
| 2002/0076674 A1 | 6/2002 | Kaplan | |
| 2002/0120486 A1 | 8/2002 | Thompson | |
| 2002/0132213 A1 | 9/2002 | Grant et al. | |
| 2002/0142269 A1 | 10/2002 | Harriman | |
| 2002/0169822 A1 | 11/2002 | Packard et al. | |
| 2003/0110215 A1 | 6/2003 | Joao | |
| 2003/0152902 A1 | 8/2003 | Altenhofen et al. | |
| 2003/0152903 A1* | 8/2003 | Theilmann | 434/350 |
| 2003/0157470 A1 | 8/2003 | Altenhofen et al. | |
| 2004/0002039 A1 | 1/2004 | Draper et al. | |
| 2004/0132000 A1 | 7/2004 | Dowdell et al. | |
| 2004/0219492 A1* | 11/2004 | Morariu et al. | 434/118 |
| 2005/0026131 A1* | 2/2005 | Elzinga et al. | 434/365 |

FOREIGN PATENT DOCUMENTS

| | | |
|---|---|---|
| JP | 2001350854 | 12/2001 |
| KR | 1020010000529 A | 1/2001 |
| KR | 1020010077749 A | 8/2001 |
| KR | 1020010103810 A | 11/2001 |
| KR | 1020020074241 A | 9/2002 |

OTHER PUBLICATIONS

Boden et al, INSPEC"Context-Free & Context-Sensitive Dynamics in Recurrent Neural Networks".Dec. 2000.
Chakrabarti et al., The VLDB Journal, "Scalable Feature Selection, Classification and Signature Generation for Organizing Large Text Databases into Hierarchical Topic Taxonomies", pp. 163-178, 1998.
Saddik et al., "Reusability and Adaptability of Interactive Resources in Web-Based Educational Systems", Spring 2001, pp. 1-19, ACM Journal of Educational Resources in Computing, vol. 1, No. 1, Article # 2.
Saddik et al., "Metadata for Smart Multimedia Learning Objects", 2000, pp. 87-94, ACE, Melbourne, Australia.
Tortora et al., "A Multilevel Learning Management System", SEKE 2002, pp. 541-547, Ischia, Italy.
McTear, "Spoken Dialogue Technology: Enabling the Conversational User Interface", Mar. 2002, pp. 90-99, ACM Computing Surveys, vol. 34, No. 1.
Shin et al., "Web-Based Interactive Virtual Laboratory System for Unit Operations and Process Systems Engineering: Issues, Design and Implementation", Feb. 2002, pp. 319-330, Computers and Chemical Engineering, vol. 26, Issue 2.
Morcos et al., "Assessing Student Learning in a Distance Education Environment", Oct. 2000, p. S3D-5, Frontiers in Education Conference, vol. 2.
Klein et al., "A Process Model for Developing Virtual Education Content", Feb. 2001, 21 pages, German Language Journal of Economic Computer Science, Issue 1, vol. 43.
Williams, "Integrating Concept Mapping Into Science Curriculum and Instructional Practice: Teacher Experiences, Observations, and Recommendations for Future Projects", 1997, pp. 457-485, Journal of Interactive Learning Research.
Morariu et al., U.S. Appl. No. 10/427,367, filed May 1, 2003, Office Action Summary, Nov. 2, 2005, 24 pages.
Morariu et al., U.S. Appl. No. 10/427,367, filed May 1, 2003, Office Action Summary, Apr. 3, 2006, 19 pages.
Morariu et al., U.S. Appl. No. 10/427,367, filed May 1, 2003, Office Action Summary, May 15, 2007, 10 pages.
Morariu et al., U.S. Appl. No. 10/427,367, filed May 1, 2003, Office Action Summary, Oct. 29, 2007, 10 pages.
Morariu et al., U.S. Appl. No. 10/427,367, filed May 1, 2003, Office Action Summary, Apr. 28, 2008, 11 pages.
Morariu et al., U.S. Appl. No. 10/427,367, filed May 1, 2003, Office Action Summary, Oct. 17, 2008, 11 pages.
Morariu et al., U.S. Appl. No. 10/427,367, filed May 1, 2003, Office Action Summary, Mar. 9, 2009, 11 pages.
Klein et al., "A Process Model for Developing Virtual Education Content", German Language Journal of Economic Computer Science, Issue 1, Feb. 2001.
Frisby, U.S. Appl. No. 10/427,367, Examiner's Answer, Oct. 16, 2009, 14 pages.
Frisby, Office Action Communication for U.S. Appl. No. 10/427,367 dated Nov. 18, 2013, U.S. Appl. No. 10/427,367, 11 pages.
Frisby, Office Action Communication for U.S. Appl. No. 10/427,367 dated Dec. 23, 2014, U.S. Appl. No. 10/427,367, 13 pages.
Frisby, Office Action Communication for U.S. Appl. No. 10/427,367 dated Jun. 12, 2013, U.S. Appl. No. 10/427,367, 15 pages.
Frisby, Office Action Communication for U.S. Appl. No. 10/427,367 dated Jul. 14, 2014, U.S. Appl. No. 10/427,367, 11 pages.

* cited by examiner

COMPUTER-IMPLEMENTED METHOD, SYSTEM AND PROGRAM PRODUCT FOR PROVIDING AN EDUCATIONAL PROGRAM

CROSS-REFERENCE TO RELATED APPLICATION

This application is related in some aspects to co-pending U.S. application Ser. No. 10/427,367, filed May 1, 2003 and entitled "Method, System and Program Product for Designing an Educational Program and Providing Educational Content," which is hereby incorporated by reference.

FIELD OF THE INVENTION

In general, the present invention provides a computer-implemented method, system and program product for providing an educational program. Specifically, the present invention provides an improved way to aggregate learning objects into an educational program without reducing the reusability of the learning objects.

BACKGROUND OF THE INVENTION

As the use of technology in business continues to advance, education can be critical to the success of any organization. For example, as a business faces rapid changes and diversity in its competitive market and its technological base, it is important that personnel be sufficiently educated. Since many organizations have finite resources, education of personnel must often be based on a desired proficiency/competency level, a time frame and a cost factor.

In providing education within an organization, several types of delivery strategies are possible. One type of delivery strategy is commonly referred to as "informative," and involves the communication of information to one or more "learners." This type of delivery strategy is often practiced when a learner obtains content via the World Wide Web. Another type of delivery strategy is referred to as "interactive," which involves interaction of a learner with one or more computer programs. Still another type of delivery strategy is referred to as "collaborative." A collaborative delivery strategy typically involves remote interaction of a learner with peers, a mentor or an instructor (e.g., over a network). Collaborative delivery strategy is commonly practiced in a "distance learning" environment. Yet another type of delivery strategy is referred to as "co-located." This type of delivery strategy involves in-person instruction or mentoring such as in a classroom environment.

In providing optimal education to individuals, an organization need not be limited to one type of delivery strategy. That is, the most efficient and cost effective manner of educating individuals could involve a combination of delivery strategies. This phenomena is typically referred to as "blended learning/education." For example, assume an organization wishes to educate 25 individuals regarding certain health care regulations (e.g., HIPPA). Further assume that the organization wishes the individuals to have an expert proficiency level in the regulations, and is not concerned about the cost. In this scenario, an educational program could involve both co-located and collaborative delivery strategies.

The above-incorporated patent application describes a system that allows an organization to design the most effective program for its needs. In designing an educational program as indicated therein, it is often the case that multiple learning objects might form the educational program. In such a case, the interrelationship between the learning objects should be understood. For example, if learning objects "A," "B," and "C" are selected for an educational program, the order in which they should be delivered as well as their interrelationship to one another should be made clear so that the educational program can be presented in the most effective manner. To date, this type of "contextual data" has been stored within the learning objects themselves. For example, the relationship of learning object "A" to learning object "B" would be stored within the learning objects themselves. This approach is not only highly inefficient, but also adversely impacts the reusability of the learning objects. For example, if learning objects "A," "B," and "C" were selected for the program, they would each need to be adapted in this manner. If, for a future educational program, learning object A was selected along with learning objects "X" and "Y," learning object "A" would have to be further adapted to include the contextual data for learning objects "X" and "Y." Over the course of time, the learning objects would become consumed with contextual data. However, if the contextual data could be realized as a separate entity or structure, the reusability of the learning objects would be greatly enhanced.

In view of the foregoing, there exists a need for a system whereby learning objects can be aggregated to form an educational program without having to store the associated contextual data within the learning objects themselves. That is, a need exists for a system whereby contextual data for a learning object is realized as a separate structure.

SUMMARY OF THE INVENTION

In general, the present invention provides a computer-implemented method, system and program product for providing an educational program. Specifically, under the present invention a plurality of learning objects for an educational program are provided. Based on the learning objects, a solution scenario having contextual data for interrelating the plurality of learning objects is developed. Under the present invention, the solution scenario is maintained separately from each of the plurality of learning objects. Using the solution scenario, the plurality of learning objects are aggregated to form the educational program.

A first aspect of the present invention provides a computer-implemented method for providing an educational program, comprising: providing a plurality of learning objects having educational content; providing a solution scenario having contextual data for interrelating the plurality of learning objects, wherein the solution scenario is maintained separately from each of the plurality of learning objects; and aggregating the plurality of learning objects using the solution scenario to yield the educational program.

A second aspect of the present invention provides a computerized system for providing an educational program, comprising: a solution scenario system for providing a solution scenario having contextual data for interrelating a plurality of learning objects having educational content, wherein the solution scenario is maintained separately from each of the plurality of learning objects; and an aggregation system for aggregating the plurality of learning objects using the solution scenario to yield the educational program.

A third aspect of the present invention provides a program product stored on a recordable medium for providing an educational program, which when executed, comprises: program code for providing a solution scenario having contextual data for interrelating a plurality of learning objects having educational content, wherein the solution scenario is maintained separately from each of the plurality of learning objects; and program code for aggregating the plurality of learning objects using the solution scenario to yield the educational program.

A fourth aspect of the present invention provides a system for deploying an educational program application, comprising: a computer infrastructure being operable to: provide a plurality of learning objects having educational content; provide a solution scenario having contextual data for interrelating the plurality of learning objects, wherein the solution scenario is maintained separately from each of the plurality of learning objects; and aggregate the plurality of learning objects using the solution scenario to yield the educational program.

Therefore, the present invention provides a computer-implemented method, system and program product for providing an educational program.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For illustrative purposes, this description will have the following sections:
I. Technical Description
II. Illustrative Examples
I. Technical Description As indicated above, the present invention provides a computer-implemented method, system and program product for providing an educational program. Specifically, under the present invention a plurality of learning objects for an educational program are provided. Based on the learning objects, a solution scenario having contextual data for interrelating the plurality of learning objects is developed. Under the present invention, the solution scenario is maintained separately from each of the plurality of learning objects. Using the solution scenario, the plurality of learning objects are aggregated to form the educational program.

Figure 1:
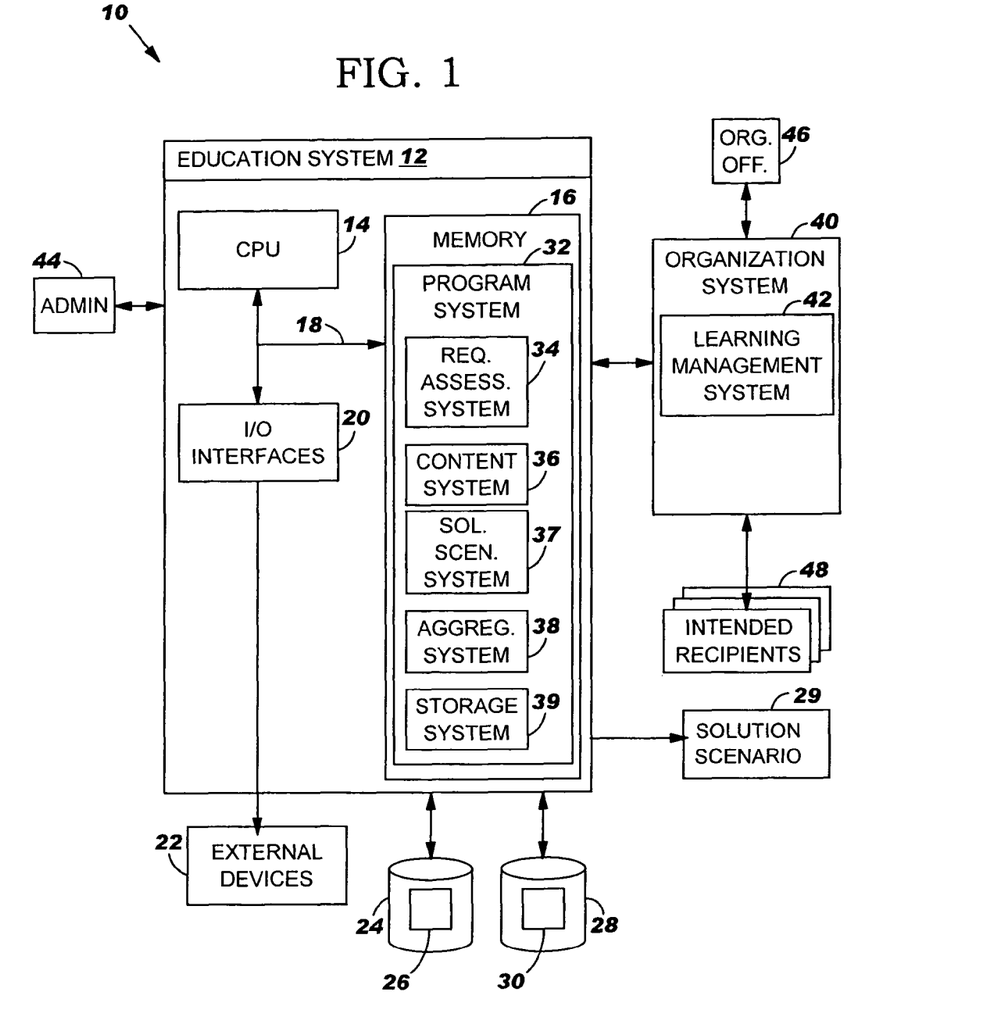
FIG. 1 depicts a system for providing an educational program according to the present invention.

Referring now to FIG. 1, a system 10 for providing/designing an educational program and for providing educational content is depicted. As shown, system 10 includes an education system 12 that communicates with an organization system 40. Education system 12 is intended to represent any computerized system that facilitates the designing of educational programs, and the providing of educational content. For example, education system 12 could be a server operated by a service provider or the like that helps other organizations implement educational programs for personnel. To this extent, organization system 40 is generally operated by or on behalf of an organization (e.g., a business) that wishes to implement educational programs for intended recipients 48 (e.g., personnel). For example, organization system 40 could be operated by a hospital that wishes to educate/train its personnel on the latest health care legislation. It should be appreciated that the names "education system" and "organization" are used for illustrative purposes only, and that the teachings of the present invention are not intended to be limited thereby. It should further be understood that the present invention could be offered as a business method whereby users are charged on a fee or subscription basis.

As shown, education system 12 generally includes central processing unit (CPU) 14, memory 16, bus 18, input/output (I/O) interfaces 20, external devices/resources 22 and storage units 24 and 28. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, similar to CPU 14, memory 16 may reside at a single physical location, comprising one or more types of data storage, or be distributed across a plurality of physical systems in various forms.

I/O interfaces 20 may comprise any system for exchanging information to/from an external source. External devices/resources 22 may comprise any known type of external device, including speakers, a CRT, LED screen, hand-held device, keyboard, mouse, voice recognition system, speech output system, printer, monitor/display, facsimile, pager, etc. Bus 18 provides a communication link between each of the components in education system 12 and likewise may comprise any known type of transmission link, including electrical, optical, wireless, etc.

Storage units 24 and 28 can be any systems (e.g., databases) capable of providing storage for a design repository 26 and a content repository 30 under the present invention. As such, storage units 24 and 28 could each include one or more storage devices, such as a magnetic disk drive or an optical disk drive. In another embodiment, storage units 24 and 28 include data distributed across, for example, a local area network (LAN), wide area network (WAN) or a storage area network (SAN) (not shown).

It should be understood that separate storage units 24 and 28 are shown for storing design repository 26 and content repository 30 for illustrative purposes only. To this extent, system 10 could be implemented with a single storage unit that provides storage for both design repository 26 and content repository 30. It should also be understood that although not shown, additional components, such as cache memory, communication systems, system software, etc., may be incorporated into education system 12. Moreover, although not shown, organization system 40 typically has computerized components (e.g., CPU, memory, etc.) similar to education system 12.

Communication between education system 12 and organization system 40 can occur in any known manner. For example, communication could occur directly, or over a network such as the Internet, a local area network (LAN), a wide area network (WAN), a virtual private network (VPN), etc. In any event, communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity.

Figure 2A:
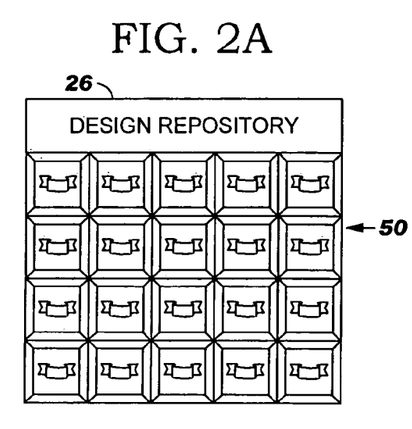
FIG. 2A depicts an illustrative design repository according to the present invention.
Figure 2B:
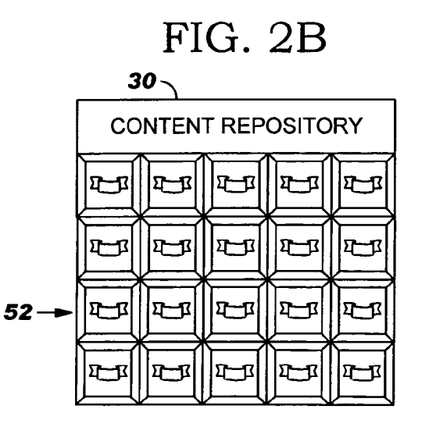
FIG. 2B depicts an illustrative content repository according to the present invention.

Stored in memory 16 of education system 12 is program system 32, which includes requirement assessment system 34, content system 36, solution scenario system 37, aggregation system 38, and storage system 39. In general, program system 32 is used to design an educational program according to a set (e.g., one or more) of requirements provided from organization system 40 (e.g., from organization official 46), and provide educational content therefor. As will be further explained below the educational program and content will be designed/provided based on design repository 26 and content repository 30. Referring to FIGS. 2A-B, design repository 26 and content repository 30 are shown in greater detail. As depicted, repositories 26 and 30 each include multiple modules/blocks 50 and 52 arranged into a column-row matrix as shown. As will be further described below in conjunction with FIG. 4, blocks 50 and 52 are organized according to a set of delivery strategies and a set of proficiency levels.

In a typical embodiment, an educational program is first designed by selecting one or more blocks of design repository 26 based on a set of requirements (e.g., as provided by organization official 46). Once the educational program is designed, content therefor can be provided. To this extent, blocks 50 of design repository 26 each include a framework for developing educational content for an educational program. Specifically, each block 50 includes patterns, templates, best practice examples, tools, guidelines, etc. for developing learning objects having educational content that will be used to educate intended recipients 48 about particular products and/or services. Moreover, the framework provided within blocks 50 typically includes framework for both formal and informal uses, as well as high end and low end pricing for educating intended recipients 48 about any type of product or service.

Figure 3:
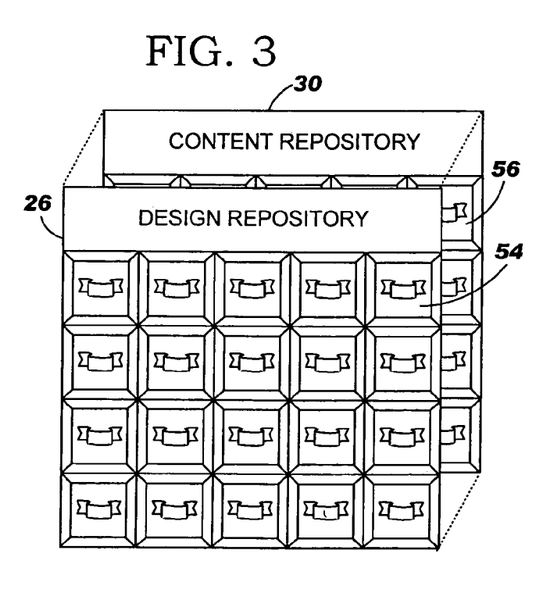
FIG. 3 depicts the correspondence of the design repository of FIG. 2A to the content repository of FIG. 2B.

As shown in FIG. 3, blocks 52 of content repository 30 correspond to blocks 50 of design repository (and vice versa). For example, block 54 corresponds to block 56. This correspondence is potentially valuable because blocks 52 of content repository could each include "previously created" educational content that could be reused when appropriate. For example, assume that a learning object containing educational content was developed for educating personnel of company "A" about product "Z" using the framework in block 54. Once developed, the learning object could be stored within block 56. Further assume that the following month, company "B" wished to educate its personnel about the same product. In this case, the learning object used for company "A" could be retrieved from block 56 and reused, thus, obviating the need for company "B" to re-develop the learning object.

Figure 4:
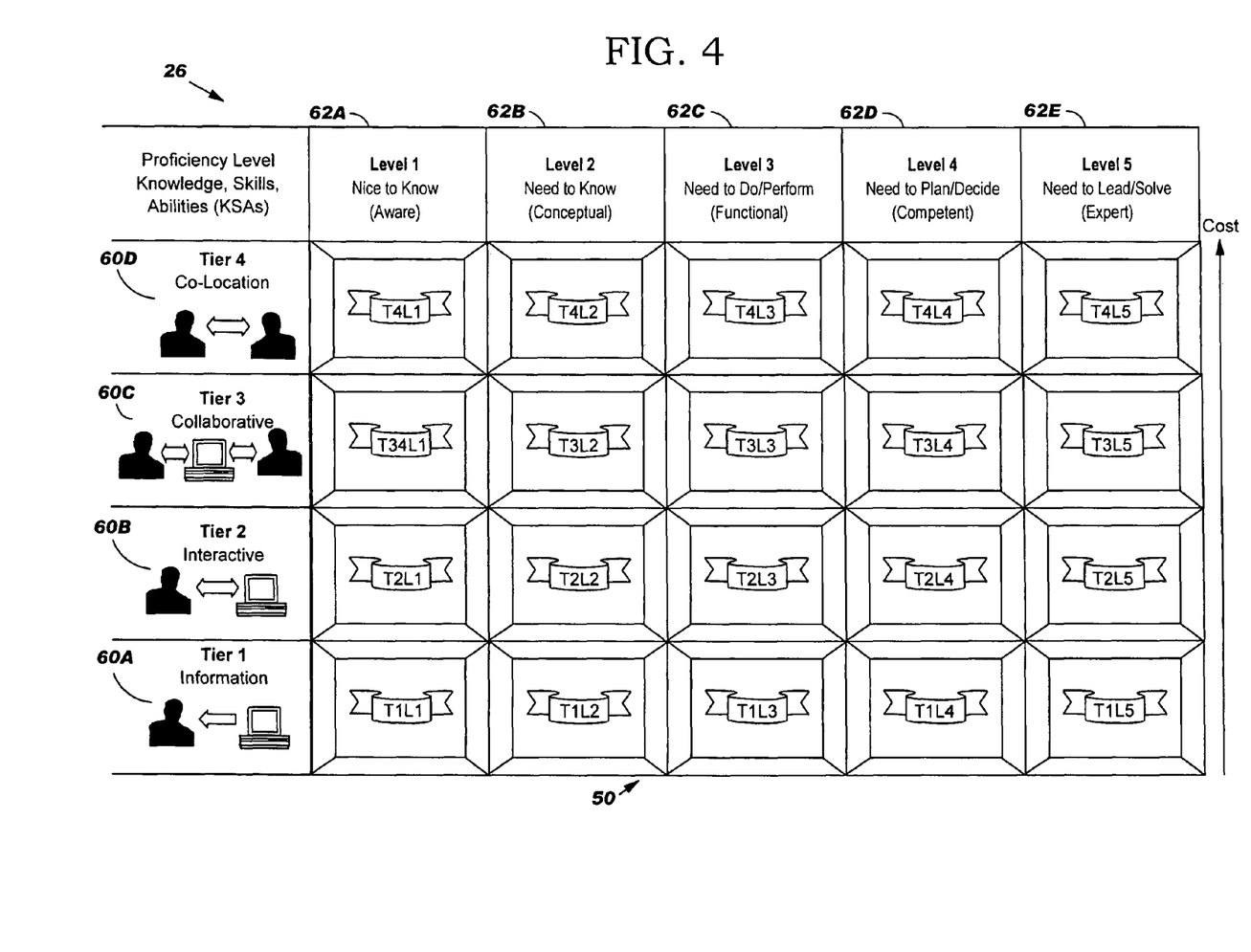
FIG. 4 depicts a more detailed view of the design repository of FIG. 2A.

Referring now to FIG. 4, design repository 26 will be explained in greater detail. It should be understood in advance that because content repository 30 and design repository 26 are "symmetrical," both repositories are generally organized in the same manner. As shown, design repository 26 includes blocks 50 organized according to a set of delivery strategies 60A-D and a set of proficiency levels 62A-E. Delivery strategy 60A is referred to as "tier 1" or the "informative" delivery strategy. As indicated above, delivery strategy 60A is where an intended recipient 48 will receive information/content such as over the World Wide Web. With delivery strategy 60A, no interaction typically takes place. Delivery strategy 60B is referred to as "tier 2" or the "interactive" delivery strategy. With delivery strategy 60B, one or more intended recipients 48 will interact with a computer program or the like. That is, no "human" to "human" interaction takes place. Delivery strategy 60C is referred to as "tier 3" or "collaborative." In this delivery strategy, intended recipients 48 are educated by remotely interacting with peers, mentors and/or instructors. Such interaction is generally performed over a network such as the Internet or private network (e.g., in a distance learning scenario). Delivery strategy 60D is referred to as "tier 4" or "co-located." This delivery strategy 60D involves person-person education in a common location. For example, the education of intended recipients 48 in a traditional class room environment would be considered co-located.

Set of proficiency levels 62A-E of design repository 26 represent a desired education level for intended recipients 48. As depicted, set of proficiency levels 62A-E are arranged as a progressive scale of proficiency. Proficiency level 62A or "level 1" represents a minimal or "awareness" level of proficiency, while proficiency level 62E or "level 5" represents a maximum or "expert" level of proficiency. Similarly, proficiency level 62B or "level 2" represents a "conceptual" level of proficiency, proficiency level 62C or "level 3" represents a "functional" level of proficiency, while proficiency level 62D or "level 4" represents a "competent" level of proficiency.

In general, certain delivery strategies 60A-D are best suited for certain proficiency levels 62A-E. For example, the collaborate and co-located delivery strategies 60C-D are the most effective when educating an intended recipient to higher levels of proficiencies such as proficiency levels 62D-E. Similarly, the informative delivery strategy 60A could be sufficient for educating intended recipients 48 to lower levels of proficiencies such as proficiency levels 62A-B. In general, the delivery strategies 60A-D can get progressively more costly to implement. For example, educating a group of intended recipients using the co-located delivery strategy 60D will likely be more costly to deliver than educating a group of intended recipients 48 using the informative delivery strategy 60A. Accordingly, designing the most appropriate educational program often involves an assessment of an organization's requirements such as cost, desired proficiency level, time frame, etc. into account when designing an educational program.

It should be understood that the representation of design repository 26 and content repository 30 shown in FIGS. 2A-B, 3 and 4 is intended to be illustrated only and that many other variations could be implemented within the teachings of the present invention. For example repositories 26 and 30 could be implemented with a different quantity of delivery strategies 60A-D and/or proficiency levels 62A-E.

Moreover, although shown as a two-dimensional structure, repositories 26 and 30 could be represented as any single or multidimensional structure.

Referring to FIGS. 1 and 4 collectively, the design of an educational program, and providing of learning objects having educational content will be described in greater detail. Although the above-incorporated patent application describes this process in detail, it will be repeated herein for clarity purposes. To first design an educational program, a set of requirements will be received by education system 12. Such requirements could be provided, for example, by organization official 46 and could include items such as a desired proficiency level of intended recipients 48, cost constraints (e.g., how much the organization is willing to spend on educating intended recipients 48), a time frame for completing the education of intended recipients 48, etc. Once the set of requirements have been provided, they will be assessed and an appropriate education program will be designed by selecting one or more appropriate blocks 50 of design repository 26. The educational program designed need not be comprised of a single delivery strategy or proficiency level. That is, the present invention could design a blended educational program (learning solution) to best address the needs set forth in the requirements.

In one embodiment, the set of requirements are received and then manually assessed by administrator 44. In another embodiment, the set of requirements are received and are automatically assessed by requirement assessment system 34. In either event, based on the assessment, at least one of the blocks 50 of design repository 26 will be selected. For example, assume that the set of requirements indicated a desire to educate five intended recipients 48 to an "expert" proficiency level for product "A" within two weeks. Further assume that cost was not a factor. In this case, administrator 44 or requirement assessment system 34 would select the blocks 50 within design repository 26 that would best address the requirements. In this scenario, the blocks selected would likely be one or more blocks that pertain to delivery strategies 60B-D and proficiency levels 62D-E (e.g., one or more of blocks T2L4, T3L4, T4L4, T2L5, T3L5 and T4L5).

As can be seen, the selection of the appropriate blocks is a balance of the requirements set forth by organization official 46 and expertise on the part of administrator 44 or requirement assessment system 34. To this extent, requirement assessment system 34 is typically programmed with sufficient logic to select the delivery strategies and proficiency levels that best suit the requirements set forth. Once applicable blocks have been selected, corresponding learning objects having educational content will be provided. Under the present invention, there are at least two ways for "providing" learning objects. In particular, the learning objects can be: (1) developed/assembled in a hierarchical schema using the frameworks in the selected blocks; and/or (2) previously developed learning objects can be retrieved from blocks of content repository 30 that correspond to the selected blocks of design repository 26. In the case of the former, as indicated above, each block 50 in design repository 26 includes a framework (templates, patterns, best practice examples, tools, guidelines, etc.) for developing learning objects. Assume in the above example that blocks T3L4, T4L4 and T4L5 were selected. Organization official 46 would use the framework in these blocks to develop the associated learning objects. To this extent, the framework provided in blocks 50 typically allows educational content to be developed for any range of topics. For example, a block could contain a framework for educating intended recipients 48 about a particular product (e.g., a particular computer server), a service (e.g., sales training), etc.

In any event, the learning objects developed could include anything that would be useful in educating intended recipients 48. For example, the learning objects could include educational content such as course manuals, instructor manuals, best practice examples, case studies, etc. In general, the learning objects developed will include "information elements" that contain factual information about the product or service for which intended recipients 48 are being trained, "performance elements" that focus on learning activities related to the product or service, and "assessment elements" that provide a way to assess intended recipients' 48 learning of the subject matter (e.g., tests). In addition, the framework could also allow organization official 46 to develop "competency profiles" that intended recipients 48 will complete prior to commencing education. The competency profiles will determine the proficiency levels of intended recipients 48 prior to education. It could be the case that certain intended recipients 48 are more educated than others on the particular product or service In this case, the educational program designed could be tailored to best meet the needs of each intended recipient. That is, the competency profiles could be used to prescribe an education program for each intended recipient 48.

In any event, learning objects could also be provided by accessing the blocks of content repository 30 that correspond to the selected blocks of design repository 26. As indicated above, content repository 30 typically includes previously created learning objects that may apply to a current educational program. Content system 36 (FIG. 1) will access the corresponding blocks of content repository 30 and retrieve any appropriate learning objects for organization official 46. Similarly, any learning objects that are developed by organization official 46 using the framework in the blocks of design repository 26 will be stored by storage system 39 in the corresponding blocks of content repository 30 for future use.

As can be seen, learning objects could be provided according to several different scenarios under the present invention:

A. No previously created learning objects exist in the corresponding blocks of the content repository for a particular product/service. In this case, organization official 46 will develop all necessary learning objects using the framework in the selected blocks of design repository 26.

B. Previous learning objects exist, but need to be added to or supplemented. In this case, organization official 46 will use the learning objects that are available in content repository 30, and develop new learning objects as needed using the framework in the selected blocks.

C. Previous learning objects exists, but need to be changed or revised to best fit the current situation. In this case, the framework in the selected blocks of the design repository would allow organizational official 46 to adapt the existing learning objects into a more suitable form.

D. All learning objects needed for the current educational program are provided in the corresponding blocks of content repository 30. In this case, organization official 46 need not use the framework to create additional learning objects.

Since learning objects for an educational program could already exist within content repository 30, the content repository 30 should be checked first by content system 36 prior to the development of new content using the framework within the design repository 26.

Regardless of the scenario, once all necessary learning objects for the designed educational program have been provided (e.g., developed and/or retrieved from content repository), the present invention will then provide a solution scenario for tying the learning objects together. For example, assume that learning objects "A," "B," and "C" corresponding to blocks T3L4, T4L4 and T4L5 were provided for an educational program. As indicated above, these three learning objects should then be aggregated and/or interrelated. For example, the order in which the learning objects should be presented to intended recipients 48 should be made clear. Moreover, it should be established precisely how the learning objects relate to one another. Previously, this information was inserted directly into the learning objects themselves. However, as indicated above, this process is not only inefficient, but also adversely impacts the reusability of the learning objects.

Under the present invention, a solution scenario 29 will be developed that has contextual data for interrelating the provided learning objects. The solution scenario 29 is maintained separately from each of the learning objects. Specifically, once the learning objects have been provided, solution scenario system 37 (FIG. 1) will develop a corresponding solution scenario 29. The solution scenario 29 will not only have data that indicates any order in which the learning objects should be presented, but will also include data indicating the relationship between each learning object. To this extent, the contextual data can itself include actual content. In a typical embodiment, solution scenario system 37 will generate/identify contextual data having a relationship to at least one of the provided learning objects. Thereafter, the contextual data will be classified based upon the relationship. Then, the contextual data is stored/embodied as the "solution scenario 29." Thus, all information pertaining to the interrelationship between the learning objects is maintained as a separate structure.

Figure 5:
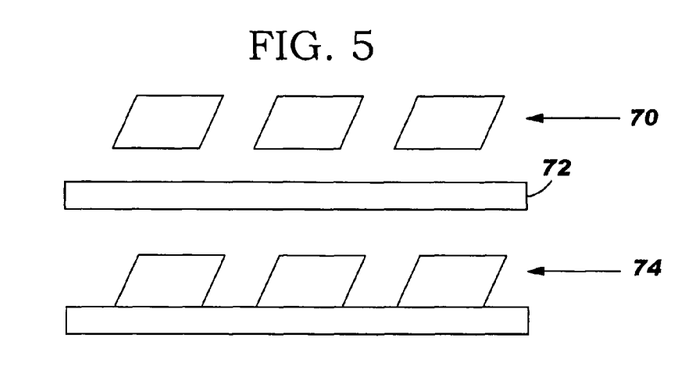
FIG. 5 depicts an aggregation of learning objects into a block according to the present invention.

Once the solution scenario 29 for learning objects "A," "B," and "C" has been developed, aggregation system 38 will aggregate the learning objects using the solution scenario 29 to yield the desired educational program. Referring now to FIG. 5, an illustrative aggregation of learning objects is shown in greater detail. Specifically, FIG. 5 depicts learning objects 70 and solution scenario 72. As further shown, learning objects are aggregated into an "educational block" 74 using solution scenario 72. Thus, solution scenario acts as a "glue" for binding and interrelating learning objects 70 together to form a block 74.

Figure 6:
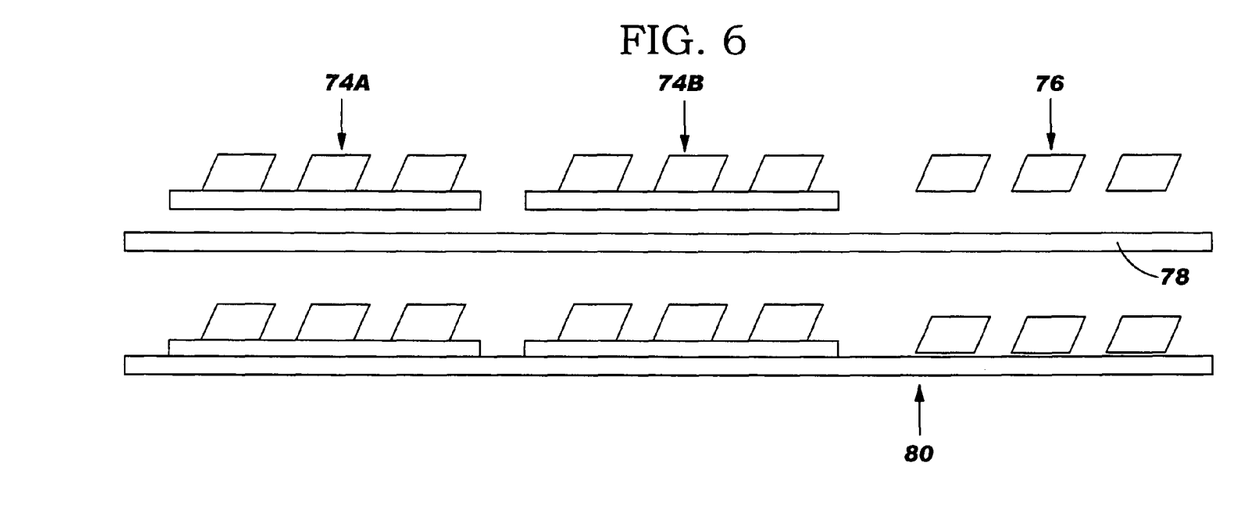
FIG. 6 depicts a further aggregation of the learning objects of FIG. 5 into a course according to the present invention.
Figure 7:
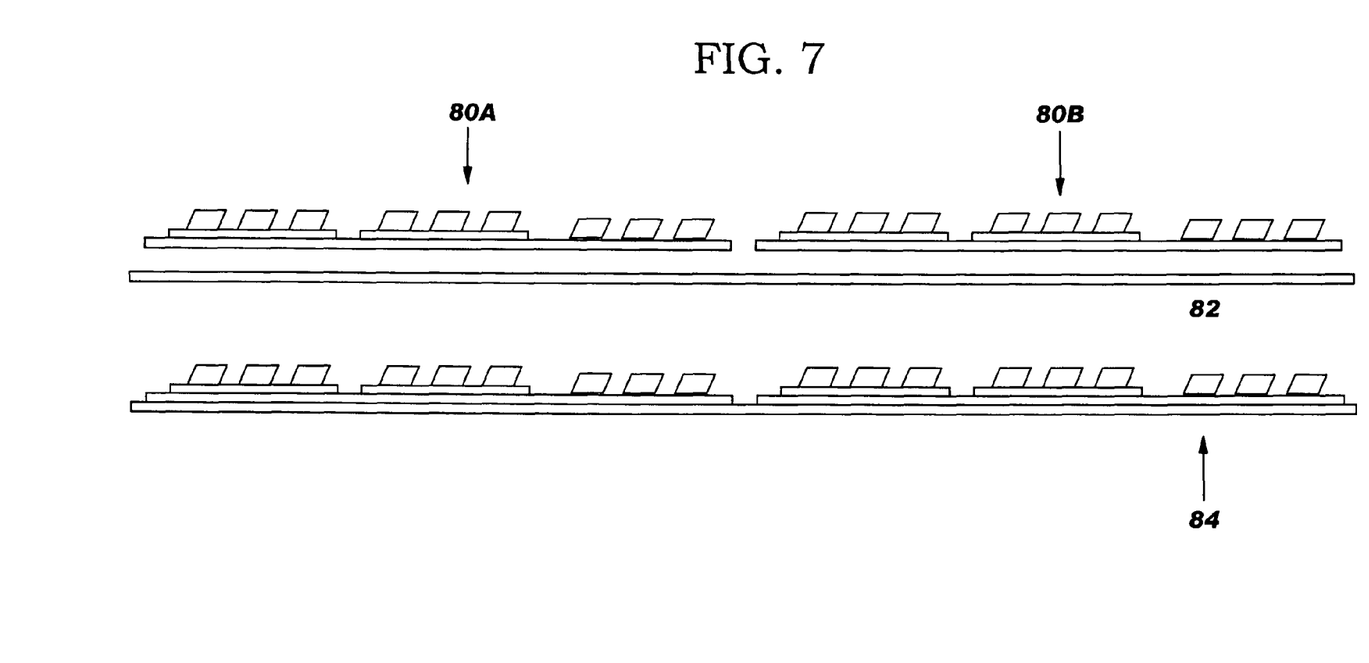
FIG. 7 depicts a further aggregation of the learning objects of FIG. 6 into a curriculum according to the present invention.

This concept can be taken further as demonstrated in FIGS. 6-7. Referring first to FIG. 6, it is shown how multiple educational blocks 74A-B and learning objects 76 can themselves be aggregated to form a larger block or an educational course 80. In such a case, solution scenario system 37 (FIG. 1) will develop solution scenario 78 containing contextual data that indicates the order in which the educational blocks 74A-B and learning objects 76 should be presented, as well as their relationship to one another. Referring to FIG. 7, it can be seen that several courses 80A-B can themselves be aggregated to form a curriculum 84. Just as before, solution scenario system 37 (FIG. 1) will develop solution scenario 82 containing contextual data that indicates the order in which courses 80A-B should be presented, as well as their relationship to one another.

As can be seen from FIGS. 5-7, the solution scenarios provided by the present invention act as a "glue" that binds smaller structures together. Moreover, by maintaining the solution scenario as a separate element/structure, manipulation of the learning objects themselves to define the interrelationships is not needed.

Referring back to FIG. 1, the solution scenario 29 can be stored as a separate structure by storage system 39 within either or both storage units 24 and 28. Moreover, the educational program that resulted from the aggregation operation (whether it be an educational block 70, a course 80, or a curriculum 84) can be stored as a unit within either or both storage units 26 and 30. This allows entire educational programs to be easily reused. In any event, the educational program can then be delivered to intended recipients 48. That is the organization, can deliver the educational program to intended recipients 48 in accordance with the delivery strategies of the selected blocks. For the example illustrated above that resulted in learning objects "A," "B," and "C" being provided, the educational content corresponding thereto will be delivered as follows:

Educational content for learning object "A" (block T3L4)—collaborative delivery strategy 60C;
Educational content for learning object "B" (block T4L4)—co-located delivery strategy 60D; and
Educational content for learning object "B" (block T4L5)—co-located delivery strategy 60D.

As further shown in FIG. 1, organization system 40 includes learning management system 42. This is intended to represent software, personnel, or any combination thereof that organizations typically have in place to facilitate the education of intended recipients 48. In preparing for the delivery of the educational program and content via learning management system or scheduler 42, requirement assessment system 34 could output a proposed education program structure/schedule for the designed educational program. The proposed educational program structure will typically identify the block(s) selected, the delivery strategies, the subject matter for the educational content, etc. The proposed educational program structure would used by the organization to educate the intended recipients 48 via the organization's learning management system or scheduler 42.

It should be understood that the present invention can be realized in hardware, software, or a combination of hardware and software. Any kind of computer/server system (s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

II. Illustrative Examples

The above described teachings will now be further illustrated in the following examples:

Example 1

Company "A" wishes to implement a policy that requires all new employees to be educated on using its web site. This week, new employee "Joe" commenced employment with company "A." Assuming company "A" did not have an educational program in place for educating new employees on use of its web site, an educational program would have to be designed. Accordingly, company "A" would first provide its set of requirements for the program. As indicated above, this could include the proficiency level to which company "A" wishes Joe to be trained/educated. It could also include any cost constraints and time frame the education must meet. Further assume that the set of requirements provided by company "A" resulted in blocks "X and Y" being selected. Content system 36 (FIG. 1) would retrieve any applicable learning objects from the corresponding blocks (X and Y) of content repository 30. Company "A" could also use the framework therein to develop any additional learning objects or revise the learning objects retrieved from content repository 30. Regardless, once the learning objects have been provided, a corresponding solution scenario having contextual data for interrelating the learning objects will be developed, and used to aggregate the learning objects to yield the educational program. Optionally, prior to commencing education, Joe could complete a competency profile. This could reveal that Joe already meets company "A's" required proficiency level on use of the web site. Alternatively, it could reveal that Joe requires the complete education. Regardless of the outcome, the learning objects will be delivered to Joe in accordance with the results of his competency profile and as dictated by the solution scenario and delivery strategies.

Example 2

Company "A" already has an educational program in place (e.g., it was designed when Joe commenced employment in Example 1). This week, "Jen" commences employment. In this case, the educational program has already been provided when educating Joe and can be reused and delivered in the same manner to Jen.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A computer-implemented method for providing an educational program in an educational content design and distribution environment, comprising:
   providing, on a computer device, a plurality of learning objects, each learning objects in the plurality of learning objects having educational content used to educate an intended recipient, the plurality of learning objects being stored in a content repository having a plurality of blocks in a row-column matrix arranged according to a set of proficiency levels and a set of delivery strategies;
   developing, using the computer device, a solution scenario that defines a framework, independent of the plurality of learning objects, for an entirety of the educational program by indicating an order of each of the plurality of learning objects and any relationships between individual ones of the plurality learning objects by way of contextual data, the contextual data including informational content that adapts a first learning object of the plurality of learning objects and a second learning object of the plurality of learning objects for specific use with one another within the educational program, wherein the solution scenario is maintained separately from each of the plurality of learning objects;
   aggregating, with the computer device, the plurality of learning objects using the solution scenario to yield the educational program;
   developing, using the computer device, a second solution scenario having the first learning object and a third learning object but not the second learning object and having different contextual data that adapts the first learning object and the third learning object for specific use with one another, wherein the solution scenario is maintained separately from each of the plurality of learning objects;
   aggregating, with the computer device, the plurality of learning objects using the second solution scenario to yield a second educational program; and
   outputting, from the computer device, results from the aggregating.

2. The method of claim 1, further comprising storing the plurality of learning objects and the solution scenario.

3. The method of claim 1, wherein the step of providing a plurality of learning objects comprises:
   providing a design repository having a plurality of blocks arranged according to a set of proficiency levels and a set of delivery strategies, each block in the design repository being directly associated with a similarly situated block in the content repository, wherein each of the plurality of blocks provides a unique framework for developing educational content;
   assessing a set of requirements for the educational program; and
   selecting from the plurality of blocks based on the assessment of the educational requirements.

4. The method of claim 3, wherein the set of delivery strategies comprises informative, interactive, collaborative and co-located.

5. The method of claim 3, wherein the set of proficiency levels comprises awareness, conceptual, functional, competent and expert.

6. The method of claim 3, wherein the framework within each of the plurality of blocks comprises at least one of templates, patterns, tools and practice examples for developing the educational content.

7. The method of claim 1, wherein the step of providing a solution scenario comprises:
   identifying contextual data having a relationship to at least one of the plurality of learning objects;
   classifying the contextual data based upon the relationship; and
   storing the contextual data in the solution scenario.

8. A computerized system for providing an educational program in an educational content design and distribution environment, comprising at least one computer device that performs a method, comprising:
   providing a plurality of learning objects, each learning object in the plurality of learning objects having educational content used to educate an intended recipient, the plurality of learning objects being stored in a content repository having a plurality of blocks in a row-column matrix arranged according to a set of proficiency levels and a set of delivery strategies;
   developing a solution scenario that defines a framework, independent of the plurality of learning objects, for an entirely of the educational program by indicating an order of each of the plurality of learning objects within the educational program and any relationships between individual ones of the plurality learning objects by way of contextual data, the contextual data including informational content that adapts a first learning object of the plurality of learning objects and a second learning object of the plurality of learning objects for specific use with one another within the educational program, wherein the solution scenario is maintained separately from each of the plurality of learning objects;

developing, using the computer device, a second solution scenario having the first learning object and a third learning object but not the second learning object and having different contextual data that adapts the first learning object and the third learning object for specific use with one another, wherein the solution scenario is maintained separately from each of the plurality of learning objects;

aggregating, with the computer device, the plurality of learning objects using the second solution scenario to yield a second educational program; and outputting results from the aggregating.

9. The system of claim 8, the method further comprising separately storing the plurality of learning objects and the solution scenario.

10. The system of claim 8, the method further comprising assessing a set of requirements for the educational program, and selecting from a plurality of blocks of a design repository based on the assessment of the educational requirements, wherein each of the plurality of blocks provides a framework for developing educational content.

11. The system of claim 10, wherein the framework within each of the plurality of blocks comprises at least one of templates, patterns, tools and practice examples for developing the educational content.

12. The system of claim 10, wherein the plurality of blocks are arranged in the design repository according to a set of set of proficiency levels and a set of delivery strategies.

13. The system of claim 12, wherein the set of delivery strategies comprises informative, interactive, collaborative and co-located.

14. The system of claim 12, wherein the set of proficiency levels comprises awareness, conceptual, functional, competent and expert.

15. The system of claim 8, wherein the process of developing the solution scenario identifies contextual data having a relationship to at least one of the plurality of learning objects, classifies the contextual data based upon the relationship, and stores the contextual data in the solution scenario.

16. A program product stored on a computer readable device for providing an educational program in an educational content design and distribution environment, which when executed, performs a method, comprising:

providing a plurality of learning objects, each learning object in the plurality of learning objects having educational content used to educate an intended recipient, the plurality of learning objects being stored in a content repository having a plurality of blocks in a row-column matrix arranged according to a set of proficiency levels and a set of delivery strategies;

developing a solution scenario that defines a framework, independent of the plurality of learning objects, for an entirety of the educational program by indicating an order of each of the plurality of learning objects within the educational program and any relationship between individual ones of the plurality learning objects by way of contextual data, the contextual data including informational content that adapts a first learning object of the plurality of learning objects and a second learning object of the plurality of learning objects for specific use with one another within the educational program, wherein the solution scenario is maintained separately from each of the plurality of learning objects aggregating the plurality of learning objects using the solution scenario to yield the educational program;

developing, using the computer device, a second solution scenario having the first learning object and a third learning object but not the second learning object and having different contextual data that adapts the first learning object and the third learning object for specific use with one another, wherein the solution scenario is maintained separately from each of the plurality of learning objects;

aggregating, with the computer device, the plurality of learning objects using the second solution scenario to yield a second educational program; and outputting results from the aggregating.

17. The program product of claim 16, the method further comprising separately storing the plurality of learning objects and the solution scenario.

18. The program product of claim 16, the method further comprising assessing a set of requirements for the educational program, and for selecting from a plurality of blocks of a design repository based on the assessment of the educational requirements, wherein each of the plurality of blocks provides a framework for developing educational content.

19. The program product of claim 18, wherein the framework within each of the plurality of blocks comprises at least one of templates, patterns, tools and practice examples for developing the educational content.

20. The program product of claim 18, wherein the plurality of blocks are arranged in the design repository according to a set of set of proficiency levels and a set of delivery strategies.

21. The program product of claim 20, wherein the set of delivery strategies comprises informative, interactive, collaborative and co-located.

22. The program product of claim 20, wherein the set of proficiency levels comprises awareness, conceptual, functional, competent and expert.

23. The program product of claim 16, wherein the program code for providing the solution scenario identifies contextual data having a relationship to at least one of the plurality of learning objects, classifies the contextual data based upon the relationship, and stores the contextual data in the solution scenario.

24. A system for deploying an educational program application in an educational content design and distribution environment, comprising:

a computer infrastructure being operable to:

provide a plurality of learning objects, each learning object in the plurality of learning objects having educational content used to educate an intended recipient, the plurality of learning objects being stored in a content repository having a plurality of blocks in a row-column matrix arranged according to a set of proficiency levels and a set of delivery strategies;

develop a solution scenario that defines a framework, independent of the plurality of learning objects, for an entirety of the educational program by indicating an order of each of the plurality of learning objects within the educational program and any relationship between individual ones of the plurality learning objects by way of contextual data, the contextual data including informational content that adapts a first learning object of the plurality of learning objects and a second learning object of the plurality of learning objects for specific use with one another within the educational program, wherein the solution scenario is maintained separately from each of the plurality of learning objects;

aggregate the plurality of learning objects using the solution scenario to yield the educational program;

develop, using the computer device, a second solution scenario having the first learning object and a third learning object but not the second learning object and having different contextual data that adapts the first learning object and the third learning object for specific use with one another, wherein the solution scenario is maintained separately from each of the plurality of learning objects;

aggregate, with the computer device, the plurality of learning objects using the second solution scenario to yield a second educational program; and output results from the aggregating.

25. The system of claim 24, wherein the computer infrastructure is further operable to separately store the plurality of learning objects and the solution scenario.

26. The system of claim 24, wherein the computer infrastructure is operable to provide the plurality of learning objects by:

providing a design repository having a plurality of blocks arranged according to a set of proficiency levels and a set of delivery strategies, wherein each of the plurality of blocks provides a framework for developing educational content;

assessing a set of requirements for the educational program; and selecting from plurality of blocks based on the assessment of the educational requirements.

27. The system of claim 26, wherein the set of delivery strategies comprises informative, interactive, collaborative and co-located.

28. The system of claim 26, wherein the set of proficiency levels comprises awareness, conceptual, functional, competent and expert.

29. The system of claim 26, wherein the framework within each of the plurality of blocks comprises at least one of templates, patterns, tools and practice examples for developing the educational content.

30. The system of claim 24, wherein computer infrastructure provides the solution scenario by:

identifying contextual data having a relationship to at least one of the plurality of learning objects;

classifying the contextual data based upon the relationship; and storing the contextual data in the solution scenario.

* * * * *